United States Patent
Patil et al.

(10) Patent No.: US 11,259,218 B2
(45) Date of Patent: Feb. 22, 2022

(54) SYSTEMS AND METHODS FOR HANDOVER OF DUAL CONNECTIVITY USER EQUIPMENT

(71) Applicant: Verizon Patent and Licensing Inc., Basking Ridge, NJ (US)

(72) Inventors: Sudhakar Reddy Patil, Westlake, TX (US); Jignesh S. Panchal, Hillsborough, NJ (US); Frank Jager, Chester, NJ (US); Maqbool Chauhan, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/915,109

(22) Filed: Jun. 29, 2020

(65) Prior Publication Data

US 2021/0410020 A1 Dec. 30, 2021

(51) Int. Cl.
*H04W 4/00* (2018.01)
*H04W 36/00* (2009.01)
*H04W 36/32* (2009.01)

(52) U.S. Cl.
CPC ... *H04W 36/0033* (2013.01); *H04W 36/0069* (2018.08); *H04W 36/00837* (2018.08); *H04W 36/32* (2013.01)

(58) Field of Classification Search
CPC ............. H04W 36/0033; H04W 36/32; H04W 36/0069; H04W 36/00837
USPC ........................................................ 370/331
See application file for complete search history.

(56) References Cited

U.S. PATENT DOCUMENTS

| | | | |
|---|---|---|---|
| 9,578,671 B2* | 2/2017 | Blankenship | H04W 76/15 |
| 9,723,651 B2* | 8/2017 | Ozturk | H04W 52/0212 |
| 10,368,279 B2* | 7/2019 | Fujishiro | H04W 36/08 |
| 10,750,410 B2* | 8/2020 | Vrzic | H04W 36/0016 |
| 11,064,513 B1* | 7/2021 | Babaei | H04W 72/1278 |
| 2018/0027456 A1* | 1/2018 | Nagasaka | H04L 5/0032 370/331 |
| 2018/0235018 A1* | 8/2018 | Comstock | H04W 8/26 |
| 2020/0313833 A1* | 10/2020 | Yi | H04W 52/0212 |
| 2020/0314671 A1* | 10/2020 | He | H04W 72/042 |

(Continued)

OTHER PUBLICATIONS

3GPP TS 37.340 V16.1.0 (Mar. 2020), "3rd Generation Partnership Project; Technical Specification Group Radio Access Network; Evolved Universal Terrestrial Radio Access (E-UTRA) and NR; Multi-connectivity; Stage 2 (Release 16)," Mar. 2020 (available at https://www.3gpp.org/ftp/Specs/archive/37_series/37.340/37340-g10.zip).

(Continued)

*Primary Examiner* — Amancio Gonzalez

(57) ABSTRACT

A system described herein may provide a technique for maintaining and transferring context information for a Dual Connectivity ("DC")-capable User Equipment ("UE") and a secondary Next Generation Node B ("gNB") in situations where the UE is connected to a primary gNB and the secondary gNB and is handed over to an evolved Node B ("eNB"). The context information may be provided to the eNB without releasing resources or tearing down bearers at the secondary gNB, such that the UE may seamlessly continue communicating with the secondary gNB while a primary connection associated with the UE is handed over from the primary gNB to the eNB.

20 Claims, 8 Drawing Sheets

(56) References Cited

U.S. PATENT DOCUMENTS

2020/0314745 A1* 10/2020 Yi .................... H04W 28/04
2020/0351782 A1* 11/2020 Kubota .............. H04W 48/08
2021/0014883 A1* 1/2021 Khoshnevisan .. H04W 72/1289

OTHER PUBLICATIONS

3GPP TS 38.413 V16.1.0 (Mar. 2020), "3rd Generation Partnership Project; Technical Specification Group Radio Access Network; NG-RAN; NG Application Protocol (NGAP) (Release 16)," Mar. 2020 (available at https://www.3gpp.org/ftp/Specs/archive/38_series/38.413/38413-g10.zip).

3GPP TS 36.413 V16.1.0 (Mar. 2020), "3rd Generation Partnership Project; Technical Specification Group Radio Access Network; Evolved Universal Terrestrial Radio Access Network (E-UTRAN); S1 Application Protocol (S1AP) (Release 16)," Mar. 2020 (available at https://www.3gpp.org/ftp/Specs/archive/36_series/36.413/36413-g10.zip).

3GPP TS 23.502 V16.4.0 (Mar. 2020), "3rd Generation Partnership Project; Technical Specification Group Services and System Aspects; Procedures for the 5G System (5GS); Stage 2 (Release 16)," Mar. 2020 (available at https://www.3gpp.org/ftp/Specs/archive/23_series/23.502/).

* cited by examiner

SYSTEMS AND METHODS FOR HANDOVER OF DUAL CONNECTIVITY USER EQUIPMENT

BACKGROUND

Wireless network providers may utilize radio access networks ("RANs") that implement different radio access technologies ("RATs"), such as Long-Term Evolution ("LTE") RATs, Fifth Generation ("5G") or New Radio ("NR") RATs, and/or other RATs. One example arrangement of RANs that may be implemented by a wireless network provider may include a Non-Standalone ("NSA") arrangement, in which portions of a 5G RAN may be correlated to portions of a LTE RAN. Another example arrangement is a Standalone ("SA") arrangement, in which a 5G RAN may be communicatively coupled to a core network without control signaling being handled by a LTE RAN. Some RANs (e.g., in a NSA arrangement or in a SA arrangement) may implement different 5G RATs, such as a "Sub-6 GHz" RAT and/or a millimeter-wave ("mmWave") RAT. In such arrangements, User Equipment ("UEs"), such as UEs that implement a dual connectivity ("DC") mode, may simultaneously connect to multiple base stations according to multiple RATs.

DETAILED DESCRIPTION OF THE PREFERRED EMBODIMENTS

Figure 1A:
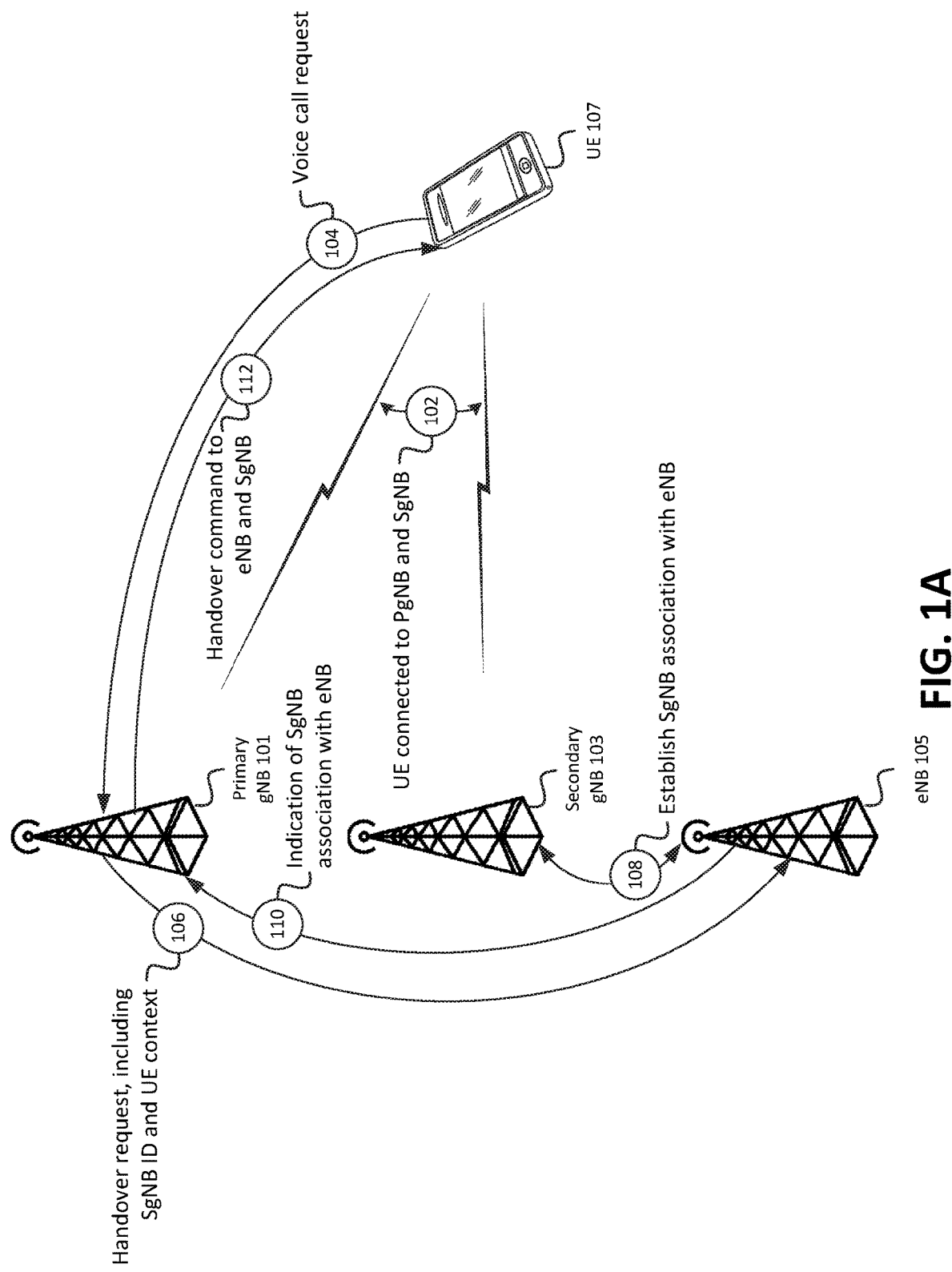
FIGS. 1A and 1B illustrate an example overview of one or more embodiments described herein, in which a UE that implements a DC mode may remain connected to a particular base station while a handover is performed with respect to another base station to which the UE is connected.

The following detailed description refers to the accompanying drawings. The same reference numbers in different drawings may identify the same or similar elements.

In some implementations of a wireless network, multiple RANs may be provided in which multiple different RATs are implemented. Such RATs may include an LTE RAT, one or more 5G RATs (e.g., a Sub-6 GHz RAT and a mmWave RAT), and/or some other type of RAT. Some UEs, such as mobile telephones, may implement a DC mode, by which the UEs may simultaneously communicate via multiple RATs (e.g., a LTE RAT and a mmWave RAT, a Sub-6 GHz RAT and a mmWave RAT, etc.).

In order to provide the simultaneous connections to such a UE, a RAN that includes base stations according to multiple RATs may include a first base station that acts as a "primary" base station and provides connectivity according to one RAT, as well as a second base station that acts as a "secondary" base station and provides connectivity according to a different RAT. In some situations, a UE may request or otherwise be involved in a handover, in which the UE connects to a different base station.

For example, if the UE is connected to multiple base stations associated with a 5G RAN (e.g., a primary Next Generation Node B ("gNB") and a secondary gNB), the UE may make or receive a voice call. In some implementations, the 5G RAN may not support voice call services, whereas a neighboring LTE RAN may support such services. In such implementations, the UE may first connect to the LTE RAN prior to establishing the voice call (sometimes referred to as "Evolved Packet System ("EPS") fallback" or "LTE fallback"). Further, since the UE is DC-capable (e.g., is able to connect to the LTE RAN and to the secondary gNB to which the UE was previously connected), the UE may reconnect to the secondary gNB after participating in a handover from the primary gNB to the eNB. Such a scenario may involve a consolidation of context information from the secondary gNB to the primary gNB, the release of resources associated with the context(s) associated with the secondary gNB and the UE, the passing of such context information to the eNB, and the reconnection of the UE to the secondary gNB (and the ensuing re-provisioning of the resources that were just released with respect to the secondary gNB).

In accordance with embodiments described herein, the context information for the UE and the secondary gNB may be maintained and transferred to the eNB, thus eliminating the process of releasing and re-provisioning the resources associated with the connection between the UE and the secondary gNB. Eliminating the process of releasing and re-provisioning these resources may enhance a user experience of a user of the UE by minimizing or eliminating connection disruptions due to tearing down and reestablishing a connection between the UE and the secondary gNB. Further, processing and/or other resources of the network may be conserved by eliminating the need for such release and re-provisioning.

For example, as shown in FIG. 1A, Primary gNB ("PgNB") 101, Secondary gNB ("SgNB") 103, and eNB 105 may be within communication range of UE 107. While other gNBs, eNBs, and/or other types of base stations may be within communication range of UE 107, the example discussed herein is in the context of PgNB 101, SgNB 103, and eNB 105. As further shown, UE 107 may be connected (at 102) to PgNB 101 and SgNB 103. For example, UE 107 may be a DC-capable UE, which has circuitry and/or logic that is suitable to simultaneously communicate with multiple base stations according to multiple RATs.

For example, PgNB 101 may implement a first 5G RAT (e.g., a Sub-6 GHz RAT) while SgNB 103 implements a second 5G RAT (e.g., a mmWave RAT). Accordingly, UE 107 may obtain differentiated levels of service that are associated with these different RATs by way of simultaneously communicating with PgNB 101 and SgNB 103. PgNB 101 and SgNB 103 may each maintain context information associated with their respective connections with UE 107. For example, PgNB 101 and SgNB 103 may each maintain information such as bearer identifiers ("IDs"), Access Point Names ("APNs"), and/or other identifiers that are associated with logical connections or traffic flows between SgNB 103 and UE 107. In some embodiments, the context information may include identifiers of one or more logical connections, traffic flows, tunnels, or the like between one or more core network elements (e.g., a User Plane Function ("UPF")) and gNBs 101 and 103.

Additionally, as PgNB 101 is the "primary" gNB in this scenario, PgNB 101 may also maintain context information regarding the connection between SgNB 103 and UE 107. SgNB 103 may provide such information to PgNB 101 via an Xn interface and/or via some other suitable communication pathway. Further, PgNB 101 may maintain one or more identifiers of SgNB 103 (e.g., a X2AP ID), which may be used to access or communicate with SgNB 103 via a X2 interface.

UE 107 may send and/or receive traffic from a core network associated with PgNB 101 and SgNB 103, such as a 5G core ("5GC"). For example, PgNB 101 and SgNB 103 may be communicatively coupled to a UPF associated with the 5GC (e.g., via a N3 interface). PgNB 101 and SgNB 103 may receive downlink traffic (e.g., traffic for UE 107) from the 5GC via the UPF, and may provide uplink traffic (e.g., traffic from UE 107) to the 5GC via the UPF. The context information associated with UE 107 may further include context information for bearers, traffic flows, or the like between the 5GC (e.g., one or more UPFs) and gNBs 101 and 103.

As further shown in this example, UE 107 may output (at 104) a voice call request to PgNB 101. In other examples, PgNB 101 may receive an incoming voice call for UE 107 (e.g., a call placed to UE 107, with a corresponding call request received by PgNB 101 via a core network). As discussed above, PgNB 101 may not support voice call services, and the voice call request may accordingly cause UE 107 and/or PgNB 101 to determine that UE 107 should be handed over to a base station that supports voice call services (e.g., eNB 105). As noted above, such a process may be referred to as EPS fallback or LTE fallback. While discussed in the context of scenarios where a handover to eNB 105 is triggered by a voice call (at 104), similar concepts discussed herein may apply to other types of scenarios in which UE 107 is handed over from PgNB 101 to eNB 105.

Based on the voice call request (at 104) and the ensuing determination that an EPS fallback procedure should be performed, PgNB 101 may output (at 106) a handover request to eNB 105. For example, PgNB 101 may select and/or identify eNB 105 based on a configuration in which PgNB 101 is associated with eNB 105 (e.g., in which PgNB 101 is configured to provide handover requests to eNB 105, as opposed to other potential eNBs). In some embodiments, PgNB 101 may select and/or identify eNB 105 based on one or more other factors, such as load and/or congestion information associated with eNB 105 (which may be provided to PgNB 101 by eNB 105 via a X2 interface, and/or may be provided to PgNB 101 by some other device or system that monitors such information).

The handover request (sent at 106) may include one or more identifiers of SgNB 103 (e.g., a X2AP ID), as well as context information associated with the connection between UE 107 and SgNB 103. In some embodiments, the handover request may include context information associated with one or more bearers, traffic flows, or the like between UE 107 and PgNB 101. For example, the context information associated with UE 107 and PgNB 101 may include context information associated with the voice call request (received at 104). Such context information may include, for example, an identifier (e.g., a International Mobile Subscriber Identity ("MR"), International Mobile Station Equipment Identity ("IMEI"), or the like) of one or more other UEs for which the call request is intended and/or other suitable information that may be used to establish the call.

In some embodiments, the handover request may include, and/or may in the form of, a X2AP handover request. In accordance with some embodiments, as described further below, the handover request (at 106) may include one or more messages sent to and/or received by one or more other devices or systems, such as a Mobility Management Entity ("MME") communicatively coupled to eNB 105 and/or an Access and Mobility Management Function ("AMF") communicatively coupled to PgNB 101 and/or SgNB 103. As discussed below, the MME and the AMF may communicate via an N26 interface and/or some other suitable communication pathway.

Based on the handover request received (at 106) by eNB 105, eNB 105 may establish (at 108) an association with SgNB 103. For example, eNB 105 may request, instruct, and/or otherwise indicate to SgNB 103 that eNB 105 is a "primary" node with regard to UE 107 (e.g., that UE 101 is being handed over to eNB 105 from PgNB 101), and that SgNB 103 is a "secondary" node with respect to eNB 105 and UE 107 (e.g., that SgNB 103 is to continue communicating with UE 107 via one or more already established bearers). Based on the indication (at 108), SgNB 103 may maintain information indicating the eNB 105 is a primary node with respect to UE 107, and may provide an acknowledgment or other indication to eNB 105 that SgNB 103 has maintained such information.

Once eNB 105 receives such acknowledgement, eNB 105 may indicate (at 110) to PgNB 101 that SgNB 103 has been associated with eNB 105 (e.g., that SgNB 103 has been added as a secondary node with respect to UE 107). For example, as discussed below, eNB 105 may notify an associated MME, which may in turn notify an AMF associated with PgNB 101, which may notify (at 110) PgNB 101 of the completed association process between SgNB 103 and eNB 105 with respect to UE 107.

Once PgNB 101 has received (at 110) this notification from eNB 105 (e.g., via a MME, AMF, and/or one or more other devices or systems), PgNB 101 may output (at 112) a handover command to UE 107. The handover command may include an identifier of eNB 105 and SgNB 103, information regarding one or more frequency bands and/or RATs implemented by eNB 105 and SgNB 103, and/or other information that UE 107 may use to connect to eNB 105 and SgNB 103 (e.g., maintain its connection with SgNB 103). For example, UE 107 may use the information provided (at 112) to perform a cell reselection procedure, and may scan for SgNB 103 and eNB 105 by scanning for particular bands and/or RATs indicated in the handover command.

Figure 1B:
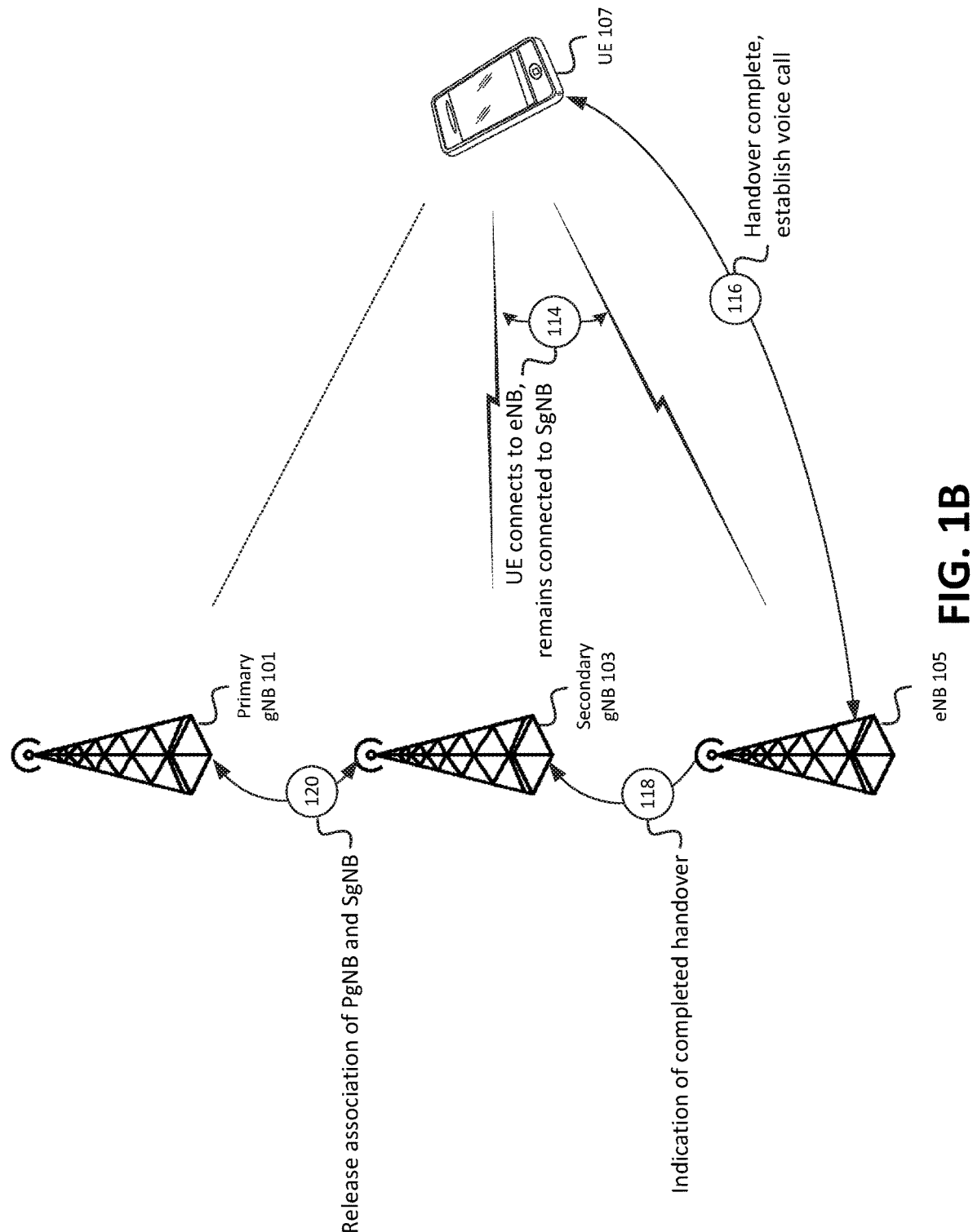

As shown in FIG. 1B, as a result of the scanning, UE 107 may connect (at 114) to SgNB 103 and eNB 105. That is, UE 107 may maintain a logical connection to SgNB 103 (e.g., one or more bearers, traffic flows, or the like). In some embodiments, UE 107 may perform a Radio Resource Control ("RRC") reconnection procedure, RRC reconfiguration, RRC connection establishment procedure, or the like to reconnect to SgNB 103 based on the information provided (at 112) in the handover command. Similarly, in order to connect to eNB 105, UE 107 may participate in an RRC connection establishment procedure or some other suitable procedure in order to connect to eNB 105 (e.g., using the information provided (at 112) in the handover command). As also denoted in FIG. 1B by the dashed lines, UE 107 may disconnect from PgNB 101. For example, UE 107 may send one or more RRC messages (or other suitable messages) to PgNB 101 indicating a UE-initiated release of the connection between UE 107 and PgNB 101, and/or UE 107 may disconnect without sending such messages to PgNB 101.

Once UE 107 has connected (at 114) to eNB 105, UE 107 may communicate (at 116) via eNB 105. For example, the call request (received at 104) may be completed via eNB 105, and a voice call between UE 107 and one or more other UEs indicated in the call request may be established. Further, UE 107 may continue to communicate with SgNB 103 via one or more existing bearers (e.g., as present during the connection (at 102) between UE 107 and SgNB 103). In this manner, as discussed above, such bearers associated with SgNB 103 and UE 107 may not need to be reestablished when UE 107 performs (at 114) the reconnection process with SgNB 103, thus conserving network resources and minimizing service disruption to UE 107.

Once the handover has been completed, in some embodiments, eNB 105 may notify (at 118) SgNB 103 that the handover has been completed. In some embodiments, the notification may include Secondary Node ("SN") Reconfiguration Complete message. For example, eNB 105 may provide this notification to SgNB 103 via a X2 interface or some other suitable communication pathway. Based on this notification, SgNB 103 may begin communicating with a LTE core network (e.g., a Serving Gateway ("SGW") of the LTE core network) to send and/or receive traffic associated with UE 107. For example, SgNB 103 may send uplink traffic associated with UE 107 to the SGW via an S1-U interface between SgNB 103 and the SGW, and may receive downlink traffic associated with UE 107 from the SGW via the S1-U interface (and/or some other suitable communication pathway). The communications with the LTE core network (e.g., the SGW) may replace communications between SgNB 103 and the 5GC (e.g., as discussed above with respect to communications 102).

Further based on this notification (at 118), SgNB 103 may determine that the association between PgNB 101 and SgNB 103 with respect to UE 107 is no longer needed, and SgNB 103 may release (at 120) an association (e.g., a Xn association) between PgNB 101 and SgNB 103, may instruct PgNB 101 to release the association, and/or may otherwise notify PgNB 101 that such association is no longer necessary. Accordingly, PgNB 101 and/or SgNB 103 may release resources allocated to maintaining this association.

Figure 2:
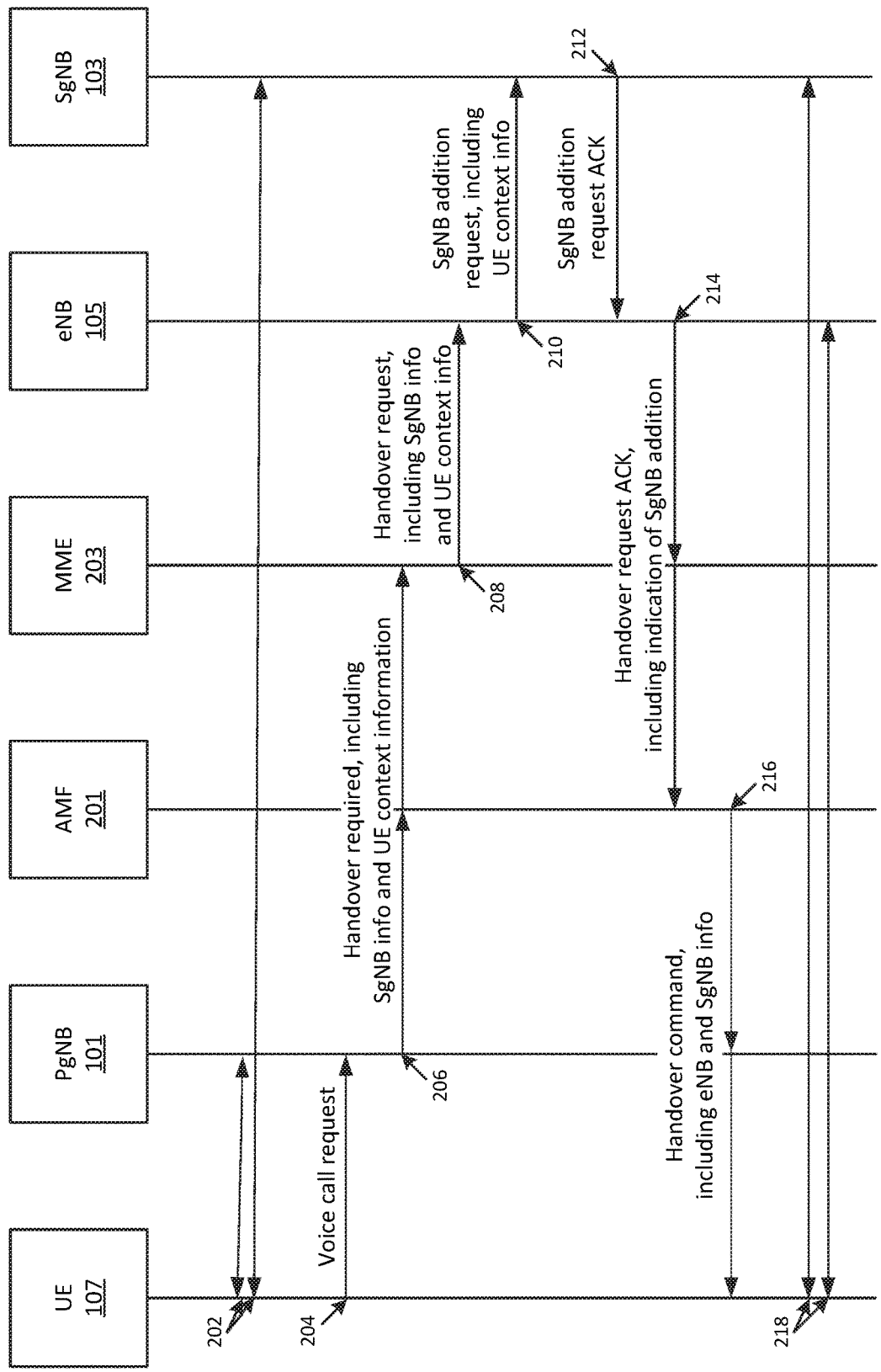
FIG. 2 illustrates an example signal flow for the handover of a UE that implements a DC mode from one base station to another, while a context associated with a third base station is maintained.

FIG. 2 illustrates an example signal flow for the handover of a UE that implements a DC mode from one base station to another (e.g., from PgNB 101 to eNB 105), while a context associated with a third base station (e.g., SgNB 103) is maintained. As shown, for example, UE 107 may be initially connected (at 202) to PgNB 101 and SgNB 103. For example, as discussed above, UE 107 may be a DC-capable UE by which UE 107 may simultaneously maintain connections to multiple base stations according to multiple RATs.

As further shown UE 107 may output (at 204) a voice call request, which may be received by PgNB 101. Based on the voice call request (and/or based on some other event, such as an incoming voice call request for UE 107 and/or some other determination that UE 107 should be handed over to eNB 105), PgNB 101 may output (at 206) a Handover Required message to AMF 201. For example, this message may be sent to AMF 201 via an N2 interface between PgNB 101 and AMF 201. The Handover Required message may include one or more identifiers of SgNB 103 (e.g., a X2AP ID), as well as context information associated with one or more bearers, traffic flows, and/or other types of logical connections between UE 107 and SgNB 103. Further, the Handover Required message may include context information associated with one or more bearers, traffic flows, and/or other types of logical connections between UE 107 and PgNB 101. The Handover Required message may also include one or more identifiers of eNB 105. As discussed above, PgNB 101 may select or identify eNB 105, out of a set of candidate eNBs, based on a mapping of PgNB 101 to eNB 105, performance and/or load information associated with the set of candidate eNBs, or may use some other suitable process to select or identify eNB 105. In some embodiments, some or all of the above information may be provided via a Source eNB to Target eNB Transparent Container Information Element ("IE").

AMF 201 may forward (at 206) the Handover Required message to MME 203, which may be an MME that is communicatively coupled to the selected eNB 105. In some embodiments, this request may be forwarded via an N26 interface between AMF 201 and MME 203. Based on the Handover Required message, MME 203 may output (at 208) a Handover Request message to eNB 105, including the identifier(s) of eNB 105 (e.g., the X2AP ID) and the context information associated with UE 107 (e.g., the context information associated with logical connections between UE 107 and gNBs 101 and 103). Based on receiving (at 208) the Handover Request, eNB 105 may update tunnel information, such as one or more uplink Tunnel Endpoint IDs ("TEIDs") associated with the context(s) associated with UE 107. For example, eNB 105 may set the TEIDs to an SGW of the LTE network.

Further based on receiving (at 208) the Handover Request message, eNB 105 may output (at 210) a Secondary Node ("SN") Addition Request message to SgNB 103, including the context information associated with the logical connections between SgNB 103 and UE 107. For example, eNB 105 may identify SgNB 103 based on the identifier(s) of eNB 105 (e.g., the X2AP ID included in the Handover Request message), and may communicate with SgNB 103 over a X2 interface using the received identifier(s) of eNB 105. The context information included in the Handover Request message may denote to SgNB 103 that eNB 105 will be the Primary Node ("PN") associated with UE 107, and that a PN-SN relationship is being established between eNB 105 and SgNB 103.

Based on receiving (at 210) the SN Addition Request and associating eNB 105 with SgNB 103 as a PN with respect to UE 107, SgNB 103 may establish one or more bearers and/or other logical communications with a LTE core network associated with eNB 105 (e.g., with a SGW of the LTE core network, which may be based on the one or more TEIDs mentioned above). Further, SgNB 103 may output (at 212) a SN Addition Request Acknowledgement ("ACK") message to eNB 105. This ACK message may indicate to eNB 105 that SgNB 103 has associated eNB 105 with SgNB 103 as a PN with respect to UE 107, and/or that SgNB 103 has established communications with the LTE core network.

ENB 105 may, in turn, output (at 214) a Handover Request ACK to MME 203, indicating that eNB 105 and SgNB 103 have completed an association between eNB 105 and SgNB 103 with respect to UE 107 (e.g., a SN Addition process). In some embodiments, the Handover Request ACK may include RRC-related information, such as one or more bands or cells implemented by SgNB 103 and/or eNB 105. In some embodiments, the bands or cells, implemented by SgNB 103 and/or eNB 105, may be provided (at 214) as a prioritized list.

MME 203 may forward (at 214) the Handover Request ACK to AMF 201, which may accordingly output (at 216) a Handover Command to PgNB 101. The Handover Command may include RRC-related information associated with SgNB 103 and/or eNB 105 (e.g., one or more bands or cells implemented by eNB 105, and/or a priority or order associated with such bands or cells), which may be based on the Handover Request ACK message provided (at 214) by eNB 105. In some embodiments, the Handover Command may be sent via an N1 interface to UE 107. That is, in some embodiments, AMF 201 may provide the Handover Command to PgNB 101 via an N1 container, which may forward (at 216) the Handover Command to UE 107 based on the N1 container.

Once UE 107 receives (at 216) the Handover Command, UE 107 may scan for and connect (at 218) to SgNB 103 and eNB 105. For example, UE 107 may perform a cell reselection procedure and/or some other suitable procedure to connect to SgNB 103 and eNB 105. As discussed above, the connection to SgNB 103 may be a reconnection or reconfiguration procedure of the existing RRC connection between UE 107 and SgNB 103.

Once UE 107 has connected (at 218) to SgNB 103 and eNB 105, UE 107 may communicate with the LTE core network via SgNB 103 and eNB 105. For example, UE 107 may resume communications that were previously sent and/or received via SgNB 103 with minimal disruption. Further UE 107 may communicate with the LTE core network via eNB 105 using Voice over LTE ("VoLTE") services or other types of services that may not necessarily be supported by PgNB 101.

Figure 3:
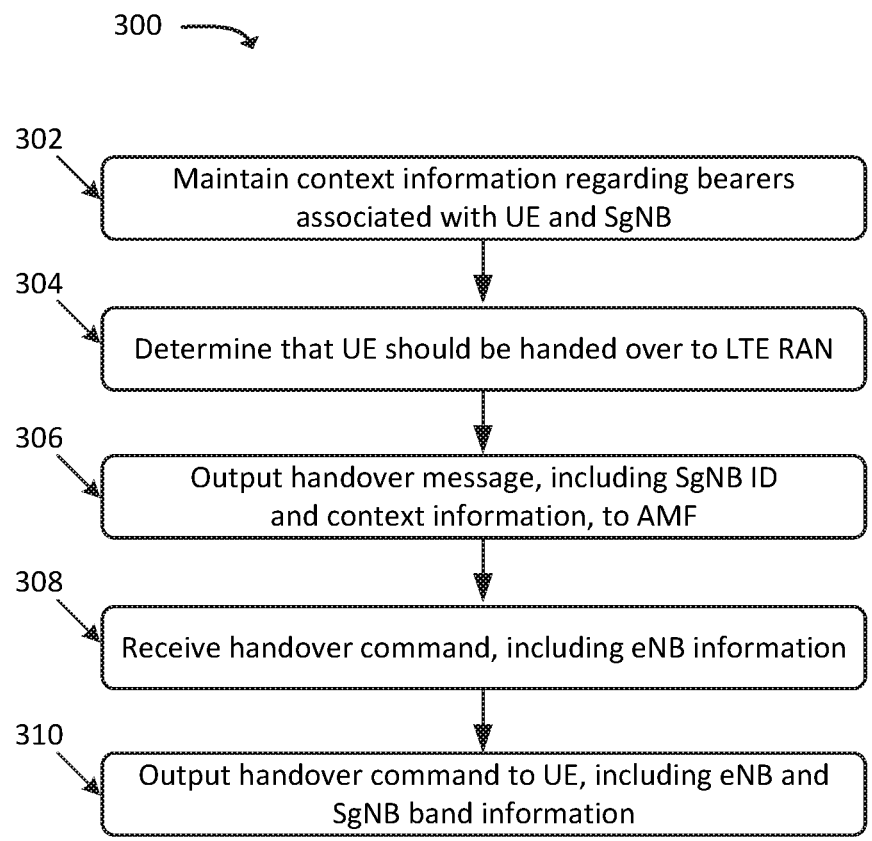
FIG. 3 illustrates an example process for the handover of a UE that implements a DC mode from one base station to another, while a context associated with a third base station is maintained.

FIG. 3 illustrates an example process 300 for the handover of DC-capable UE 107 from one primary base station (e.g., PgNB 101) to another (e.g., eNB 105), while a context associated with a third base station (e.g., SgNB 103) is maintained. In some embodiments, some or all of process 300 may be performed by a gNB (e.g., PgNB 101). In some embodiments, one or more other devices may perform some or all of process 300 in concert with, and/or in lieu of, PgNB 101.

As shown, process 300 may include maintaining (at 302) context information regarding bearers associated with UE 107 and SgNB 103. For example, PgNB 101 may maintain information regarding one or more bearers, traffic flows, tunnels, or the like between UE 107 and SgNB 103. Further, PgNB 101 may maintain information regarding one or more bearers, traffic flows, tunnels, or the like between UE 107 and PgNB 101. As discussed above, PgNB 101 may maintain context information regarding one or more bearers, traffic flows, tunnels, or the like between one or more elements of a 5GC (e.g., one or more UPFs) and gNBs 101 and 103.

Process 300 may further include determining (at 304) that UE 107 should be handed over to a LTE RAN (e.g., to eNB 105). As one example discussed above, PgNB 101 may receive an indication that a voice call request has been received for, or made by, UE 107.

Process 300 may additionally include outputting (at 306) a handover message, including one or more identifiers of SgNB 103 and context information associated with SgNB 103 and UE 107 to AMF 201. For example, PgNB 101 may output a Handover Required message to AMF 201, to which PgNB 101 is communicatively coupled. The identifier(s) of SgNB 103 may include a X2AP ID associated with SgNB 103. The context information may include one or more bearer identifiers, TEIDs, or the like, as discussed above.

Process 300 may also include receiving (at 308) a handover command, including information regarding eNB 105. For example, as discussed above, PgNB 101 may receive a Handover Command from AMF 201 after SgNB 103 and eNB 105 have performed a SN Addition process to associate eNB 105 with SgNB 103 as a PN with respect to SgNB 103 and UE 107. The Handover Command may include RRC information that may be used by UE 107 to connect to eNB 105 and SgNB 103 (e.g., reconnect to SgNB 103). In some embodiments, the Handover Command may be included in an N1 container from AMF 201.

Process 300 may further include outputting (at 310) the Handover Command to UE 107. As discussed above, UE 107 may use this information to connect to eNB 105 and SgNB 103 (e.g., to reconnect to SgNB 103). In this manner, UE 107 may communicate with eNB 105 to receive services provided by eNB 105 (e.g., VoLTE services or other services), while continuing existing communications with SgNB 103 with minimal disruption.

Figure 4:
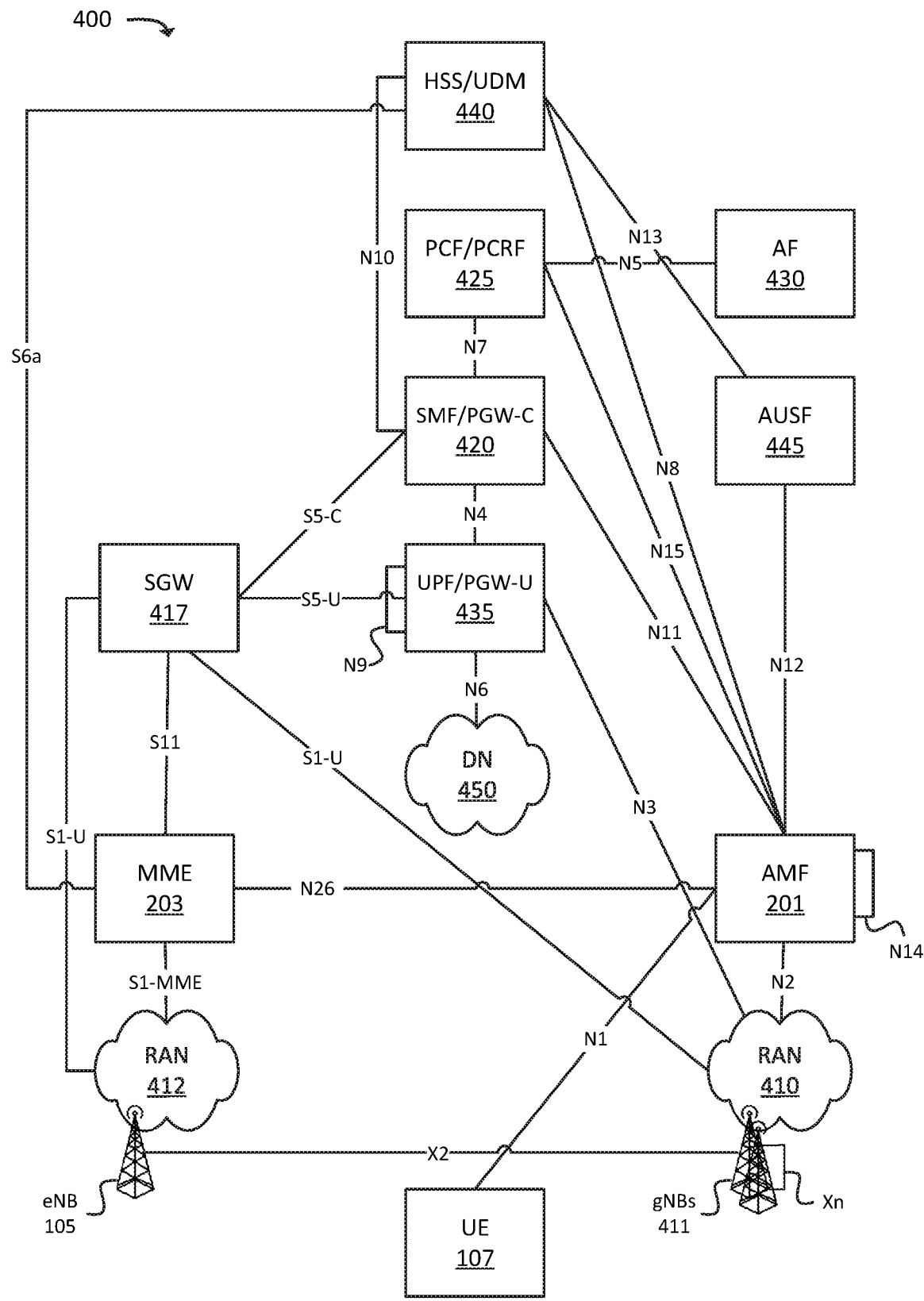
FIGS. 4 and 5 illustrate example environments in which one or more embodiments, described herein, may be implemented.

FIG. 4 illustrates an example environment 400, in which one or more embodiments may be implemented. In some embodiments, environment 400 may correspond to a 5G network, and/or may include elements of a 5G network. In some embodiments, environment 400 may correspond to a 5G NSA architecture, in which one or more 5G RATs may be used in conjunction with one or more other RATs (e.g., a LTE RAT), and/or in which elements of a 5G core network may be implemented by, may be communicatively coupled with, and/or may include elements of another type of core network (e.g., an EPC). In some embodiments, FIG. 4 represents elements of a 5GC and an EPC, such as elements that correspond to environments in which a 5G SA architecture may be implemented. For example, as discussed below with respect to FIG. 5, discrete 5G and LTE core networks may be implemented, and multiple instances of some or all of the devices or systems shown in FIG. 4 may be deployed in these discrete 5G and LTE core networks.

As shown, environment 400 may include UE 107, RAN 410 (which may include one or more Next Generation Node Bs ("gNBs") 411), RAN 412 (which may include one or more one or more evolved Node Bs ("eNBs") 413), and various network functions such as Access and Mobility Management Function ("AMF") 201, Mobility Management Entity ("MME") 203, Serving Gateway ("SGW") 417, Session Management Function ("SMF")/Packet Data Network ("PDN") Gateway ("PGW")-Control plane function ("PGW-C") 420, Policy Control Function ("PCF")/Policy Charging and Rules Function ("PCRF") 425, Application Function ("AF") 430, User Plane Function ("UPF")/PGW-User plane function ("PGW-U") 435, Home Subscriber Server ("HSS")/Unified Data Management ("UDM") 440, and Authentication Server Function ("AUSF") 445. Environment 400 may also include one or more networks, such as Data Network ("DN") 450.

As noted above, environment 400 may correspond to an NSA architecture, and/or may include elements that may be included in multiple core networks in a 5G SA architecture. Thus, the description of a given element may describe a device or system that implements the described functionality in a LTE core network (e.g., an EPC), a 5G core network (e.g., a 5GC), and/or "hybrid" core network that is able to serve as both a LTE core network and a 5G core network. For instance, in the example of PCF/PCRF 425, the functionality described below with respect to PCF/PCRF 425 may describe a PCF of a 5G core network, a PCRF of a LTE core network, and/or a device or system that serves as both or either of a PCF or a PCRF.

The quantity of devices and/or networks, illustrated in FIG. 4, is provided for explanatory purposes only. In practice, environment 400 may include additional devices and/or networks, fewer devices and/or networks, different devices and/or networks, or differently arranged devices and/or networks than illustrated in FIG. 4. For example, while not shown, environment 400 may include devices that facilitate or enable communication between various components shown in environment 400, such as routers, modems, gateways, switches, hubs, etc. Alternatively, or additionally, one or more of the devices of environment 400 may perform one or more network functions described as being performed by another one or more of the devices of environment 400. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

UE 107 may include a computation and communication device, such as a wireless mobile communication device that is capable of communicating with RAN 410, RAN 412, and/or DN 450. UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, or another type of mobile computation and communication device. UE 107 may send traffic to and/or receive traffic (e.g., user plane traffic) from DN 450 via RAN 410, RAN 412, and UPF/PGW-U 435.

RAN 410 may be, or may include, a 5G RAN that includes one or more base stations (e.g., one or more gNBs 411), via which UE 107 may communicate with one or more other elements of environment 400. UE 107 may communicate with RAN 410 via an air interface (e.g., as provided by gNB 411). For instance, RAN 410 may receive traffic (e.g., voice call traffic, data traffic, messaging traffic, signaling traffic, etc.) from UE 107 via the air interface, and may communicate the traffic to UPF/PGW-U 435, and/or one or more other devices or networks. Similarly, RAN 410 may receive traffic intended for UE 107 (e.g., from UPF/PGW-U 435, AMF 201, and/or one or more other devices or networks) and may communicate the traffic to UE 107 via the air interface. PgNB 101 and SgNB 103 may each be instances of, and/or may be implemented by, one or more gNBs 411. Multiple gNBs 411 may communicate with each other over an Xn interface.

RAN 412 may be, or may include, an LTE RAN that includes one or more base stations (e.g., one or more eNBs 413), via which UE 107 may communicate with one or more other elements of environment 400. UE 107 may communicate with RAN 412 via an air interface (e.g., as provided by eNB 413). For instance, RAN 410 may receive traffic (e.g., voice call traffic, data traffic, messaging traffic, signaling traffic, etc.) from UE 107 via the air interface, and may communicate the traffic to UPF/PGW-U 435, and/or one or more other devices or networks. Similarly, RAN 410 may receive traffic intended for UE 107 (e.g., from UPF/PGW-U 435, SGW 417, and/or one or more other devices or networks) and may communicate the traffic to UE 107 via the air interface.

AMF 201 may include one or more devices, systems, Virtualized Network Functions ("VNFs"), etc., that perform operations to register UE 107 with the 5G network, to establish bearer channels associated with a session with UE 107, to hand off UE 107 from the 5G network to another network, to hand off UE 107 from the other network to the 5G network, manage mobility of UE 107 between RANs 410 and/or gNBs 411, and/or to perform other operations. In some embodiments, the 5G network may include multiple AMFs 201, which communicate with each other via the N14 interface (denoted in FIG. 4 by the line marked "N14" originating and terminating at AMF 201).

MME 203 may include one or more devices, systems, VNFs, etc., that perform operations to register UE 107 with the EPC, to establish bearer channels associated with a session with UE 107, to hand off UE 107 from the EPC to another network, to hand off UE 107 from another network to the EPC, manage mobility of UE 107 between RANs 412 and/or eNBs 413, and/or to perform other operations.

SGW 417 may include one or more devices, systems, VNFs, etc., that aggregate traffic received from one or more eNBs 413 and send the aggregated traffic to an external network or device via UPF/PGW-U 435. Additionally, SGW 417 may aggregate traffic received from one or more UPF/PGW-Us 435 and may send the aggregated traffic to one or more eNBs 413. SGW 417 may operate as an anchor for the user plane during inter-eNB handovers and as an anchor for mobility between different telecommunication networks or RANs (e.g., RANs 410 and 412).

SMF/PGW-C 420 may include one or more devices, systems, VNFs, etc., that gather, process, store, and/or provide information in a manner described herein. SMF/PGW-C 420 may, for example, facilitate in the establishment of communication sessions on behalf of UE 107. In some embodiments, the establishment of communications sessions may be performed in accordance with one or more policies provided by PCF/PCRF 425.

PCF/PCRF 425 may include one or more devices, systems, VNFs, etc., that aggregate information to and from the 5G network and/or other sources. PCF/PCRF 425 may receive information regarding policies and/or subscriptions from one or more sources, such as subscriber databases and/or from one or more users (such as, for example, an administrator associated with PCF/PCRF 425).

AF 430 may include one or more devices, systems, VNFs, etc., that receive, store, and/or provide information that may be used in determining parameters (e.g., quality of service parameters, charging parameters, or the like) for certain applications.

UPF/PGW-U 435 may include one or more devices, systems, VNFs, etc., that receive, store, and/or provide data (e.g., user plane data). For example, UPF/PGW-U 435 may receive user plane data (e.g., voice call traffic, data traffic, etc.), destined for UE 107, from DN 450, and may forward the user plane data toward UE 107 (e.g., via RAN 410, SMF/PGW-C 420, and/or one or more other devices). In some embodiments, multiple UPFs 435 may be deployed (e.g., in different geographical locations), and the delivery of content to UE 107 may be coordinated via the N9 interface (e.g., as denoted in FIG. 4 by the line marked "N9" originating and terminating at UPF/PGW-U 435). Similarly, UPF/PGW-U 435 may receive traffic from UE 107 (e.g., via RAN 410, SMF/PGW-C 420, and/or one or more other devices), and may forward the traffic toward DN 450. In some embodiments, UPF/PGW-U 435 may communicate (e.g., via the N4 interface) with SMF/PGW-C 420, regarding user plane data processed by UPF/PGW-U 435.

HSS/UDM 440 and AUSF 445 may include one or more devices, systems, VNFs, etc., that manage, update, and/or store, in one or more memory devices associated with AUSF 445 and/or HSS/UDM 440, profile information associated with a subscriber. AUSF 445 and/or HSS/UDM 440 may perform authentication, authorization, and/or accounting operations associated with the subscriber and/or a communication session with UE 107.

DN 450 may include one or more wired and/or wireless networks. For example, DN 450 may include an Internet Protocol ("IP")-based PDN, a wide area network ("WAN") such as the Internet, a private enterprise network, and/or one or more other networks. UE 107 may communicate, through DN 450, with data servers, other UEs 107, and/or to other servers or applications that are coupled to DN 450. DN 450 may be connected to one or more other networks, such as a public switched telephone network ("PSTN"), a public land mobile network ("PLMN"), and/or another network. DN 450 may be connected to one or more devices, such as content providers, applications, web servers, and/or other devices, with which UE 107 may communicate.

Figure 5:
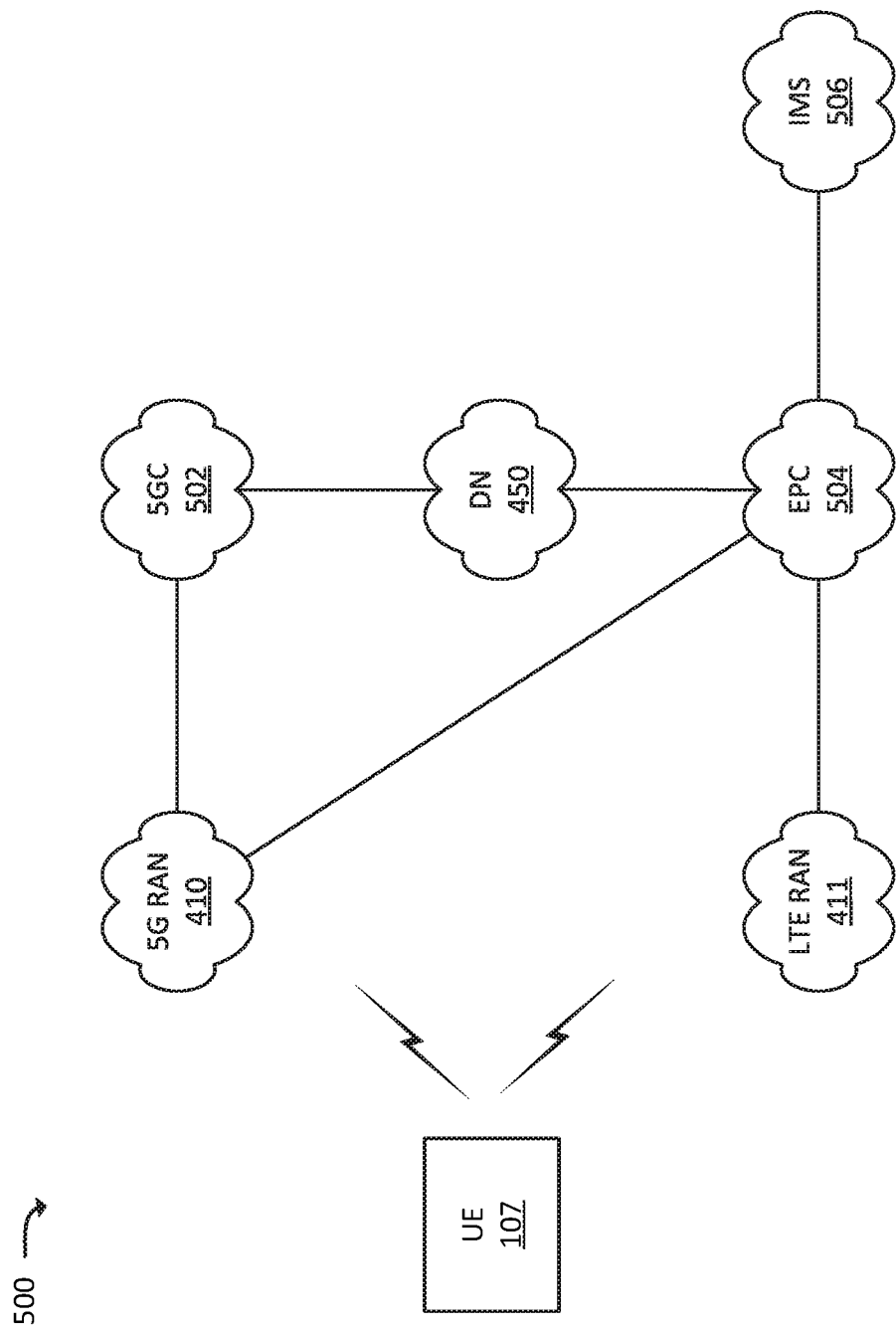

FIG. 5 illustrates an example environment 500, in which one or more embodiments may be implemented. In some embodiments, the illustration of environment 500 provided in FIG. 5 may be an alternate representation of one or more elements or networks depicted in FIG. 4. As shown in FIG. 5, 5G RAN 410 may be communicatively coupled to 5GC 502 and EPC 504, and LTE RAN 411 may be communicatively coupled to EPC 504. For example, 5GC 502 may include one or more instances of SMF 420, PCF 425, AF 430, UPF 435, UDM 440, etc. Similarly, EPC 504 may include one or more instances of SGW 417, PGW-C 420, PCRF 425, PGW-U 435, HSS 440, etc. As further shown, EPC 504 may be communicatively coupled to IP Multimedia Subsystem ("IMS") network 506, which may provide services (e.g., call setup or other control signaling) for VoLTE calls and/or other types of services.

Figure 6:
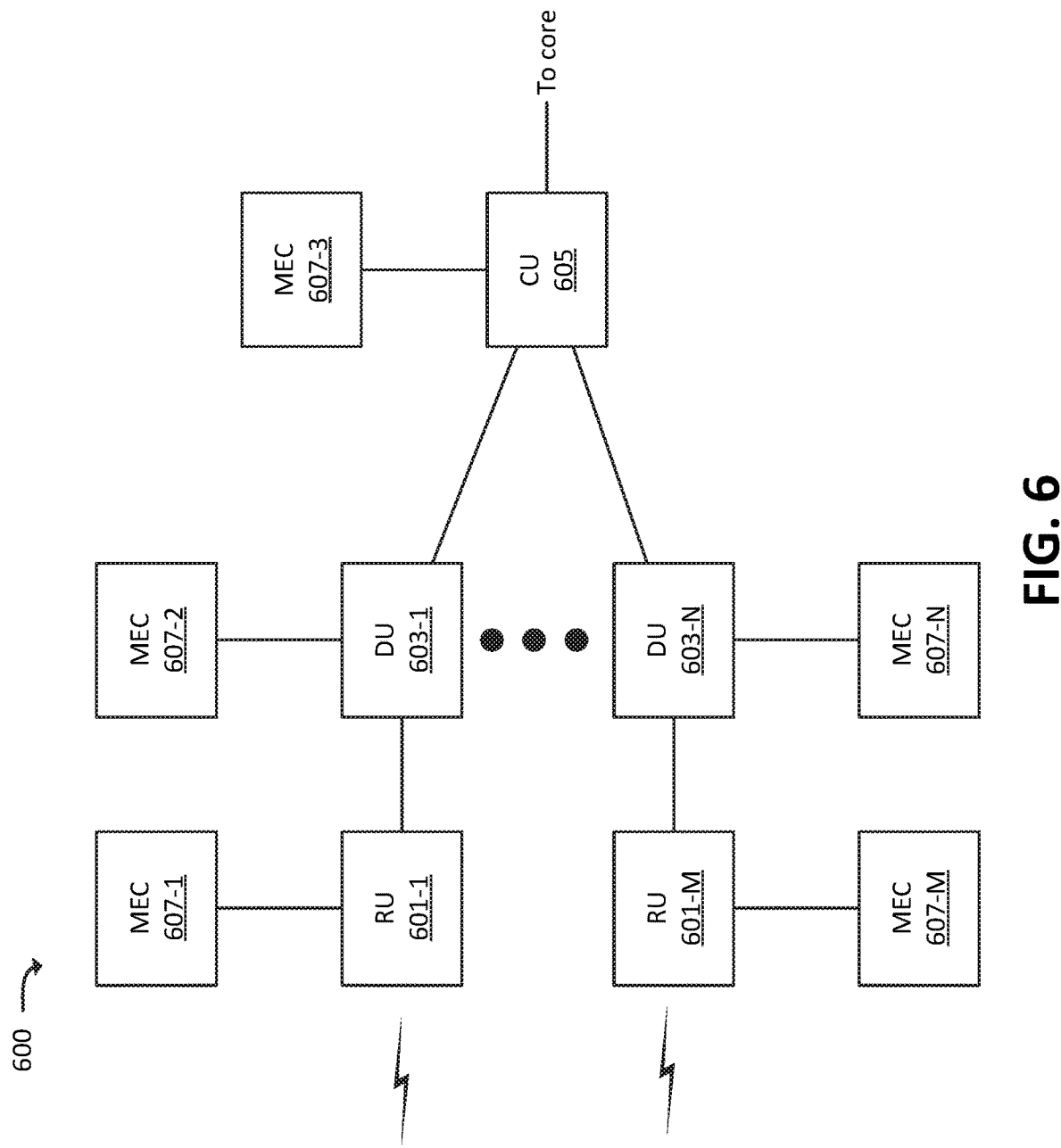
FIG. 6 illustrates an example arrangement of a radio access network ("RAN"), in accordance with some embodiments.

FIG. 6 illustrates an example Distributed Unit ("DU") network 600, which may be included in and/or implemented by one or more RANs (e.g., RAN 410). In some embodiments, a particular RAN may include one DU network 600. In some embodiments, a particular RAN may include multiple DU networks 600. In some embodiments, DU network 600 may correspond to a particular gNB 411 of a 5G RAN (e.g., RAN 410). In some embodiments, DU network 600 may correspond to multiple gNBs 411. In some embodiments, DU network 600 may correspond to one or more other types of base stations of one or more other types of RANs. As shown, DU network 600 may include Central Unit ("CU") 605, one or more Distributed Units ("DUs") 603-1 through 603-N (referred to individually as "DU 603," or collectively as "DUs 603"), and one or more Remote Units ("RUs") 601-1 through 601-M (referred to individually as "RU 601," or collectively as "RUs 601").

CU 605 may communicate with a core of a wireless network (e.g., may communicate with one or more of the devices or systems described above with respect to FIG. 4, such as AMF 201 and/or UPF/PGW-U 435). In the uplink direction (e.g., for traffic from UEs 107 to a core network), CU 605 may aggregate traffic from DUs 603, and forward the aggregated traffic to the core network. In some embodiments, CU 605 may receive traffic according to a given protocol (e.g., Radio Link Control ("RLC")) from DUs 603, and may perform higher-layer processing (e.g., may aggregate/process RLC packets and generate Packet Data Convergence Protocol ("PDCP") packets based on the RLC packets) on the traffic received from DUs 603.

In accordance with some embodiments, CU 605 may receive downlink traffic (e.g., traffic from the core network) for a particular UE 107, and may determine which DU(s) 603 should receive the downlink traffic. DU 603 may include one or more devices that transmit traffic between a core network (e.g., via CU 605) and UE 107 (e.g., via a respective RU 601). DU 603 may, for example, receive traffic from RU 601 at a first layer (e.g., physical ("PHY") layer traffic, or lower PHY layer traffic), and may process/aggregate the traffic to a second layer (e.g., upper PHY and/or RLC). DU 603 may receive traffic from CU 605 at the second layer, may process the traffic to the first layer, and provide the processed traffic to a respective RU 601 for transmission to UE 107.

RU 601 may include hardware circuitry (e.g., one or more RF transceivers, antennas, radios, and/or other suitable hardware) to communicate wirelessly (e.g., via an RF interface) with one or more UEs 107, one or more other DUs 603 (e.g., via RUs 601 associated with DUs 603), and/or any other suitable type of device. In the uplink direction, RU 601 may receive traffic from UE 107 and/or another DU 603 via the RF interface and may provide the traffic to DU 603. In the downlink direction, RU 601 may receive traffic from DU 603, and may provide the traffic to UE 107 and/or another DU 603.

RUs 601 may, in some embodiments, be communicatively coupled to one or more Multi-Access/Mobile Edge Computing ("MEC") devices, referred to sometimes herein simply as ("MECs") 607. For example, RU 601-1 may be communicatively coupled to MEC 607-1, RU 601-M may be communicatively coupled to MEC 607-M, DU 603-1 may be communicatively coupled to MEC 607-2, DU 1103-N may be communicatively coupled to MEC 607-N, CU 1105 may be communicatively coupled to MEC 607-3, and so on. MECs 607 may include hardware resources (e.g., configurable or provisionable hardware resources) that may be configured to provide services and/or otherwise process traffic to and/or from UE 107, via a respective RU 601.

For example, RU 601-1 may route some traffic, from UE 107, to MEC 607-1 instead of to a core network (e.g., via DU 603 and CU 605). MEC 607-1 may process the traffic, perform one or more computations based on the received traffic, and may provide traffic to UE 107 via RU 601-1. In this manner, ultra-low latency services may be provided to UE 107, as traffic does not need to traverse DU 603, CU 605, and an intervening backhaul network between DU network 600 and the core network.

Figure 7:
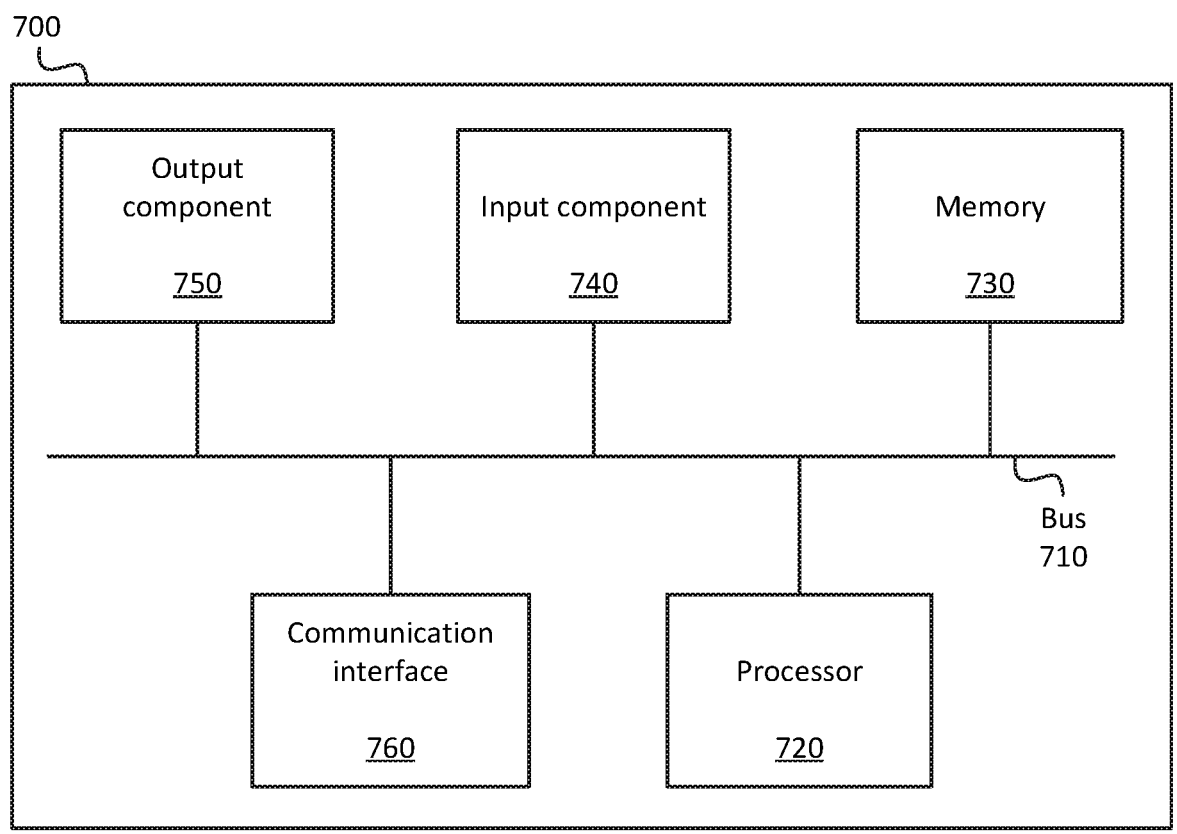
FIG. 7 illustrates example functional components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, 2, and 3), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain context information regarding one or more logical connections associated with a User Equipment ("UE") and a first base station, wherein the UE is concurrently connected to the first base station and a second base station;
determine that a handover should be performed with respect to the UE, from the second base station to a third base station;
output a handover message based on determining that the handover should be performed, the handover message including:
an identifier of the first base station, and
the context information regarding the one or more logical connections associated with the UE and the first base station;
receive an indication that the third base station has been associated with the first base station and the context information associated with the UE based on the handover message; and
instruct the UE to connect to the first base station and the third base station based on the received indication that the second base station has been associated with the third base station and the context information associated with the UE, wherein the UE connects to the third base station based on the instruction and further concurrently maintains the one or more logical connections with the first base station based on the instruction.

2. The device of claim 1, wherein the first base station implements a Fifth Generation ("5G") radio access technology ("RAT") and wherein the second base station implements a Long-Term Evolution ("LTE") RAT.

3. The device of claim 1, wherein the first base station implements a first Fifth Generation ("5G") radio access technology ("RAT"), wherein the device communicates with the UE via a second 5G RAT that is different from the first 5G RAT.

4. The device of claim 1, wherein outputting the handover message includes outputting the handover message to an Access and Mobility Management Function ("AMF").

5. The device of claim 1, wherein the context information regarding the one or more logical connections associated with the UE and the first base station include an identifier of a bearer between the UE and the first base station.

6. The device of claim 1, wherein the context information regarding the one or more logical connections associated with the UE and the first base station include an identifier of a tunnel between the first base station and a User Plane Function ("UPF").

7. The device of claim 1, wherein the indication includes a first set of bands associated with the first base station and a second set of bands associated with the second base station,
wherein instructing the UE to connect to the first base station and the second base station includes instructing the UE to perform a scanning procedure based on the first and second sets of bands.

8. A non-transitory computer-readable medium, storing a plurality of processor-executable instructions to:
maintain context information regarding one or more logical connections associated with a User Equipment ("UE") and a first base station, wherein the UE is concurrently connected to the first base station and a second base station;
determine that a handover should be performed with respect to the UE, from the second base station to a third base station;
output a handover message based on determining that the handover should be performed, the handover message including:
an identifier of the first base station, and
the context information regarding the one or more logical connections associated with the UE and the first base station;
receive an indication that the third base station has been associated with the first base station and the context information associated with the UE based on the handover message; and
instruct the UE to connect to the first base station and the third base station based on the received indication that the second base station has been associated with the third base station and the context information associated with the UE, wherein the UE connects to the third base station based on the instruction and further concurrently maintains the one or more logical connections with the first base station based on the instruction.

9. The non-transitory computer-readable medium of claim 8, wherein the first base station implements a Fifth Generation ("5G") radio access technology ("RAT") and wherein the second base station implements a Long-Term Evolution ("LTE") RAT.

10. The non-transitory computer-readable medium of claim 8, wherein outputting the handover message includes outputting the handover message to an Access and Mobility Management Function ("AMF").

11. The non-transitory computer-readable medium of claim 8, wherein the context information regarding the one or more logical connections associated with the UE and the first base station include an identifier of a bearer between the UE and the first base station.

12. The non-transitory computer-readable medium of claim 8, wherein the context information regarding the one or more logical connections associated with the UE and the first base station include an identifier of a tunnel between the first base station and a User Plane Function ("UPF").

13. The non-transitory computer-readable medium of claim 8, wherein the indication includes a first set of bands associated with the first base station and a second set of bands associated with the second base station,
wherein instructing the UE to connect to the first base station and the second base station includes instructing the UE to perform a scanning procedure based on the first and second sets of bands.

14. A method, comprising:
maintaining context information regarding one or more logical connections associated with a User Equipment ("UE") and a first base station, wherein the UE is concurrently connected to the first base station and a second base station;
determining that a handover should be performed with respect to the UE, from the second base station to a third base station;
outputting a handover message based on determining that the handover should be performed, the handover message including:
an identifier of the first base station, and
the context information regarding the one or more logical connections associated with the UE and the first base station;
receiving an indication that the third base station has been associated with the first base station and the context information associated with the UE based on the handover message; and
instructing the UE to connect to the first base station and the third base station based on the received indication that the second base station has been associated with the third base station and the context information associated with the UE, wherein the UE connects to the third base station based on the instruction and further concurrently maintains the one or more logical connections with the first base station based on the instruction.

15. The method of claim 14, wherein the first base station implements a Fifth Generation ("5G") radio access technology ("RAT") and wherein the second base station implements a Long-Term Evolution ("LTE") RAT.

16. The method of claim 14, wherein instructing the UE to connect to the first base station and the second base station includes communicating with the UE via a first Fifth Generation ("5G") radio access technology ("RAT"), wherein the first base station implements a second 5G RAT that is different from the first 5G RAT.

17. The method of claim 14, wherein outputting the handover message includes outputting the handover message to an Access and Mobility Management Function ("AMF").

18. The method of claim 14, wherein the context information regarding the one or more logical connections associated with the UE and the first base station include an identifier of a bearer between the UE and the first base station.

19. The method of claim 14, wherein the context information regarding the one or more logical connections associated with the UE and the first base station include an identifier of a tunnel between the first base station and a User Plane Function ("UPF").

20. The method of claim 14, wherein the indication includes a first set of bands associated with the first base station and a second set of bands associated with the second base station,
    wherein instructing the UE to connect to the first base station and the second base station includes instructing the UE to perform a scanning procedure based on the first and second sets of bands.

\* \* \* \* \*